(12) United States Patent
Etemad et al.

(10) Patent No.: US 8,488,967 B2
(45) Date of Patent: *Jul. 16, 2013

(54) SYSTEM AND METHOD FOR OCDMA-BASED PHOTONIC LAYER SECURITY ROBUSTNESS TO ARCHIVAL ATTACK

(75) Inventors: Shahab Etemad, Warren, NJ (US);
Thomas Banwell, Howell, NJ (US);
Janet Jackel, Holmdel, NJ (US);
Ronald Menendez, Chatham, NJ (US);
Paul Toliver, Tinton Falls, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 794 days.

This patent is subject to a terminal disclaimer.

(21) Appl. No.: 12/492,817

(22) Filed: Jun. 26, 2009

(65) Prior Publication Data

US 2010/0183309 A1 Jul. 22, 2010

Related U.S. Application Data

(63) Continuation-in-part of application No. 11/062,090, filed on Feb. 18, 2005, now Pat. No. 7,729,616.

(60) Provisional application No. 61/075,979, filed on Jun. 26, 2008.

(51) Int. Cl.
*H04J 14/02* (2006.01)
*H04B 10/00* (2006.01)
*H04B 10/04* (2006.01)
*H04B 10/06* (2006.01)
*H04K 1/00* (2006.01)

(52) U.S. Cl.
USPC ............ 398/79; 398/140; 398/190; 398/202; 380/256

(58) Field of Classification Search
USPC ................... 380/255–256; 398/140, 79, 190, 398/202, 77, 78, 183, 188, 189
See application file for complete search history.

(56) References Cited

U.S. PATENT DOCUMENTS

| 7,028,246 B2 * | 4/2006 | Kim et al. ................... 714/784 |
| 7,170,928 B1 * | 1/2007 | Horneman et al. ........... 375/225 |
| 7,200,342 B2 * | 4/2007 | Dafesh ......................... 398/182 |

(Continued)

OTHER PUBLICATIONS

S. Galli et al. "Galli" (Galli et al: "DWDM-Compatible Spectrally Phase Encoded Optical CDMA", GLOBECOM 2004, vol. 3, Nov. 29-Dec. 3, 2004, pp. 1888-1894).*

(Continued)

*Primary Examiner* — Kenneth N Vanderpuye
*Assistant Examiner* — Abbas H Alagheband
(74) *Attorney, Agent, or Firm* — Philip J. Feig

(57) ABSTRACT

A system and method for transporting encrypted data having a transmitter and a receiver is provided. The transmitter generates a sequence of optical pulses, which are copied and output as identical channels. The identical channels are modulated by a plurality of modulators using data to generate a modulated data signal. Respective spectral phase encoders coupled to each of the plurality of data modulators encode respective modulated data signals using a plurality of mutually orthogonal phase codes that are individually associated with the respective spectral phase encoder. These encoded data signals are combined and code-scrambling by a spectral phase scrambler using a scramble code as an encryption key to generate an encrypted signal. A receiver reverses the encryption to extract the data.

22 Claims, 7 Drawing Sheets

U.S. PATENT DOCUMENTS

| | | | |
|---|---|---|---|
| 7,555,216 B2* | 6/2009 | Yoshino et al. | 398/77 |
| 8,290,371 B2* | 10/2012 | Etemad et al. | 398/79 |
| 2003/0072051 A1 | 4/2003 | Myers et al. | |
| 2004/0208233 A1* | 10/2004 | Dafesh | 375/147 |
| 2004/0208602 A1* | 10/2004 | Plante | 398/140 |
| 2004/0208604 A1* | 10/2004 | Madsen | 398/147 |
| 2005/0164656 A1* | 7/2005 | Watabe et al. | 455/114.3 |
| 2006/0147219 A1* | 7/2006 | Yoshino et al. | 398/183 |
| 2007/0014343 A1* | 1/2007 | Horneman et al. | 375/225 |
| 2007/0064775 A1* | 3/2007 | Petre et al. | 375/147 |
| 2008/0045226 A1* | 2/2008 | Liu | 455/450 |
| 2010/0091990 A1* | 4/2010 | Etemad et al. | 380/256 |

OTHER PUBLICATIONS

H. Fathallah, L. A. Rusch, S. LaRochelle, "Passive optical fast frequency-hop CDMA communications system", IEEE J. of Lightwave Techn., vol. 17, pp. 397-405, 1999.

Bres, I. Glesk, R.J. Runser, P.R. Prucnal, "All-optical OCDMA code-drop unit for transparent ring networks," IEEE Photonics Technology Letters, vol. 17, No. 5, May 2005.

H. Sotobayashi, W. Chujo, K. Kitayama, "Highly spectral-efficient optical code-division multiplexing transmission system," IEEE Journal of Selected Topics in Quantum Electronics, vol. 10, No. 2, Mar.-Apr. 2004.

K. Jamshidi et al., "Statistical Analysis of Coherent Ultrashort Light Pulse CDMA with Multiple Optical Amplifiers Using Additive Noise Model", Journal of Lightwave Technology, vol. 23, No. 5, May 2005, pp. 1842-1851.

S. Etemad, P. Toliver, R. Menendez, J. Young, T. Banwell, S. Galli, J. Jackel, P. Delfyett, C. Price, T. Turpin, "Spectrally efficient optical CDMA using coherent phase-frequency coding", IEEE Photon Techn Lett., vol. 17, pp. 929-931, 2005.

T.H. Shake, "Confidentiality Performance of Spectral-Phase-Encoded Optical CDMA," IEEE Journal of Lightwave Technology, Apr. 2005, pp. 1652-1663.

D.E. Leaird Z. Jiang, A. M. Weiner, "Experimental investigation of security issues in OCDMA: A Code Switching Scheme," Electronics Letters, Jul. 7, 2005, vol. 41, No. 14, pp. 1-2.

R. Menendez R. Menendez, P. Toliver, S. Galli, A. Agarwal, T. Banwell, J. Jackel, J. Young, S. Etemad, "Network Applications of Cascaded Passive Code Translation for WDM-Compatible Spectrally Phase Encoded Optical CDMA," IEEE J. of Lightwave Technology, vol. 23, No. 10, Oct. 2005, pp. 3219-3231.

A. Agarwal, R. Menendez, P. Toliver, S. Etemad, and J. Jackel, "Code Scrambling in Spectral Phase Encoded OCDMA Using Reconfigurable Integrated Ring Resonator Based Coders," Optical Amplifiers and Applications/Coherent Optical Technologies and Applications (OAA/COTA) 2006, Paper CFD4, Whistler, Canada.

A. Agarwal, R. Menendez, P. Toliver, J. Jackel, and S. Etemad, "Enhanced Confidentiality with Multi-level Phase Scrambling in SPE-OCDMA," Invited paper, CLEO 2007, Baltimore.

A. Agarwal et al., "Fully Programmable Ring-Resonator-Based Integrated Photonic Circuit for Phase Coherent Applications," IEEE J. of Lightwave Technology, vol. 24, No. 1, Jan. 2006, pp. 77-87.

A. Agarwal, P. Toliver, T. Banwell, R. Menendez, J. Jackel, and S. Etemad, "Spectrally Efficient DPSK-OCDMA Coherent System Using Integrated Ring-Resonator-Based Coders," OFC 2007, Paper OMO5, Anaheim, USA.

V.J. Hernandez, Y. Du, W. Cong, R. P. Scott, K. Li, J. P. Heritage, Z. Ding, B. H. Kolner, S. J. Ben Yoo, "Spectral phase-encoded time spreading (SPECTS) optical code-division multiple access for terabit optical access networks", IEEE J. of Lightwave Techn., vol. 22, pp. 2671-2679, 2004.

P. Toliver, J. Young, J. Jackel, T. Banwell, R. Menendez, S. Galli, S. Etemad, "Optical Network Compatibility Demonstration of O-CDMA Based on Hyperfine Spectral Phase Coding" LEOS 2004, Paper WE3, Puerto Rico, 2004.

S. Etemad, T. Yilmaz, C. DePriest and P. Delfyett, "Mode-locked SOA as a Source for a wdm-WDM Hierarchy Architecture", Proceedings of NFOEC, 2002, pp. 876-880.

S. Galli, R. Menendez, P. Toliver, T. Banwell, J. Jackel, J. Young, S. Etemad, "DWDM-Compatible Spectrally Phase Encoded O-CDMA", IEEE Globecom'04, Dallas, Texas, 2004.

J.P.Sokoloff, P.R.Prucnal, I. Glesk and M.Kane, "A Terahertz Optical Asymmetric Demultiplexer (TOAD)", IEEE Photonic Technology Lett., 1993, vol. 5, pp. 787-790.

P.Toliver, R.J. Runser, J. Young, and J. Jackel, "Experimental Field Trial of Waveband Switching and Transmission in a Transportation Reconfigurable Optical Network", Proc. OFC, FRI (2003), vol. 2, pp. 783-784.

R. J. Runser, P. Toliver and S. McNown, "Recent results from ATDnet: an operating transparent network," in Proc. LEOS Annual Meeting, WF2 (2002), pp. 407-408.

S. Galli, R. Menendez, P. Toliver, T. Banwell, J. Jackel, J. Young, S. Etemad, "Experimental Results on the Simultaneous Transmission of Two 2.5 Gbps Optical-CDMA Channels and a 10 Gbps OOK Channel Within the Same WDM Window", Optical Fiber Communications, OFC05, Anaheim, California, 2005.

T. Shake, "Security Performance of Optical CDMA Against Eavesdropping," IEEE Journal of Lightwave Technology, vol. 23, No. 2, Feb. 2005, 655-670.

A. A. R. Lee, et al. "Avionics Architectures Incorporating Optical Fiber Technologies", IEEE, AVFOP Conference Proceedings, Sep. 2006, Annapolis.

Fred F. Froehlich, Craig H. Price, Terry M. Turpin and Janneen A. Cook. "All Optical Encryption for Links at 10 Gps and Above" Session U208, MilComm 2005.

Z. Jiang, et. al. "Reconfigurable all-optical code translation in spectrally phase-encoded O-CDMA", JLT,vol. 23, No. 6 p. 1979-1990.

C. Liang et al., "Quantum Noise Protected Data Encryption in a WDM Network", IEEE Photonics Technology Letters, vol. 17, No. 7 Jul. 2005, pp. 1573-1575.

T. Banwell, et. al., "High Data Rate Quantum Noise Protected Encryption over Long Distances" MILCOM 2005.

E. Narimanov, B. Wu, "Advanced Coding Techniques for Asynchronous Fiber-Optical CDMA," IEEE CLEOS/QELS, May 22-27, 2005, pp. 1768-1770.

Sharon Goldberg, Ron Menendez and Paul Prucnal, "Towards a Cryptanalysis of Spectral-Phase Encoded Optical CDMA with Phase-Scrambling", OFC 2007, Paper OThJ7, Anaheim, CA.

International Search Report dated Feb. 24, 2010.

* cited by examiner

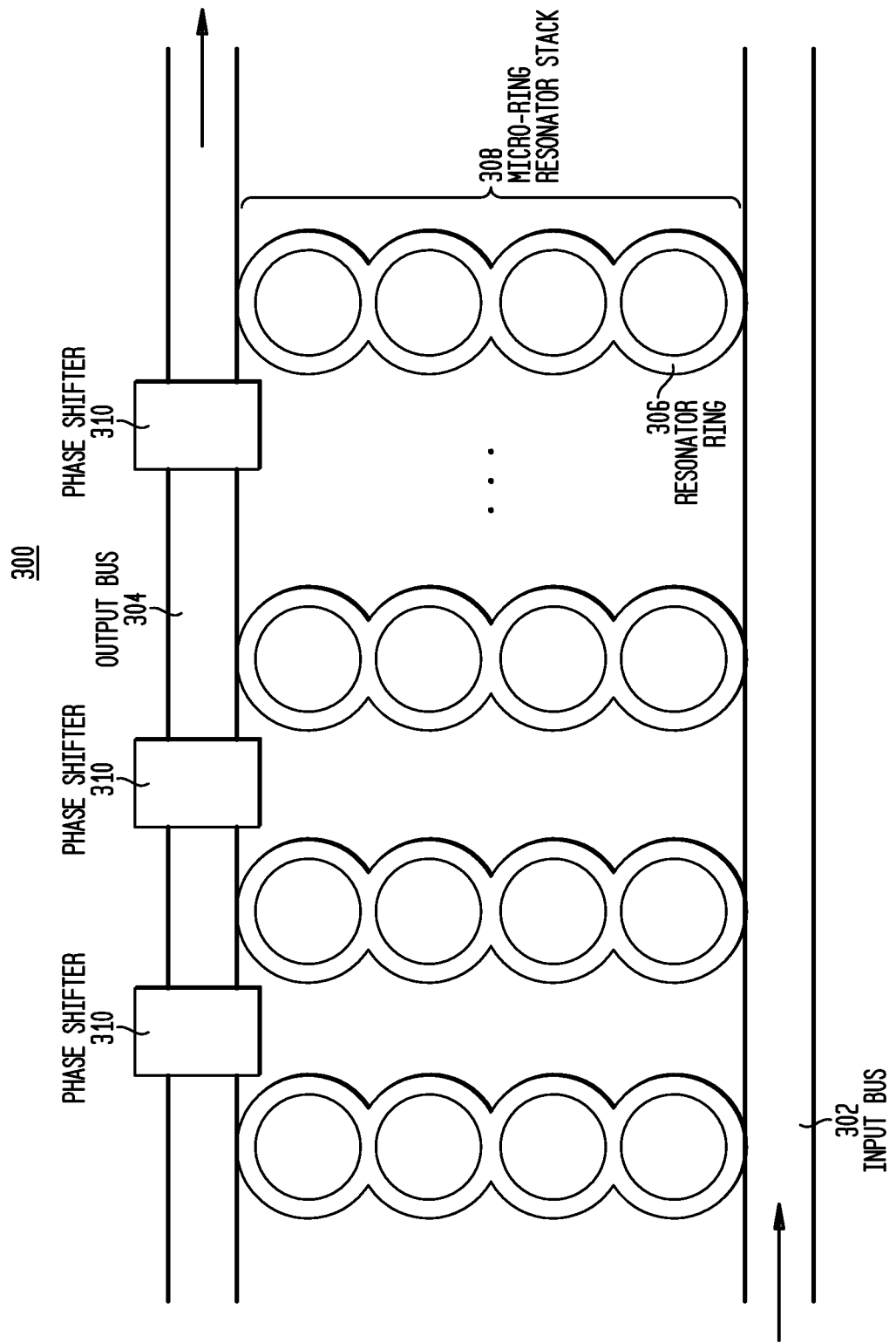

| | 1 | 2 | 3 | 4 | 5 | 6 | 7 | 8 |
|---|---|---|---|---|---|---|---|---|
| 1 | 1 | 1 | 1 | 1 | 1 | 1 | 1 | 1 |
| 2 | 1 | -1 | 1 | -1 | 1 | -1 | 1 | -1 |
| 3 | 1 | 1 | -1 | -1 | 1 | 1 | -1 | -1 |
| 4 | 1 | -1 | -1 | 1 | 1 | -1 | -1 | 1 |
| 5 | 1 | 1 | 1 | 1 | -1 | -1 | -1 | -1 |
| 6 | 1 | -1 | 1 | -1 | -1 | 1 | -1 | 1 |
| 7 | 1 | 1 | -1 | -1 | -1 | -1 | 1 | 1 |
| 8 | 1 | -1 | -1 | 1 | -1 | 1 | 1 | -1 |

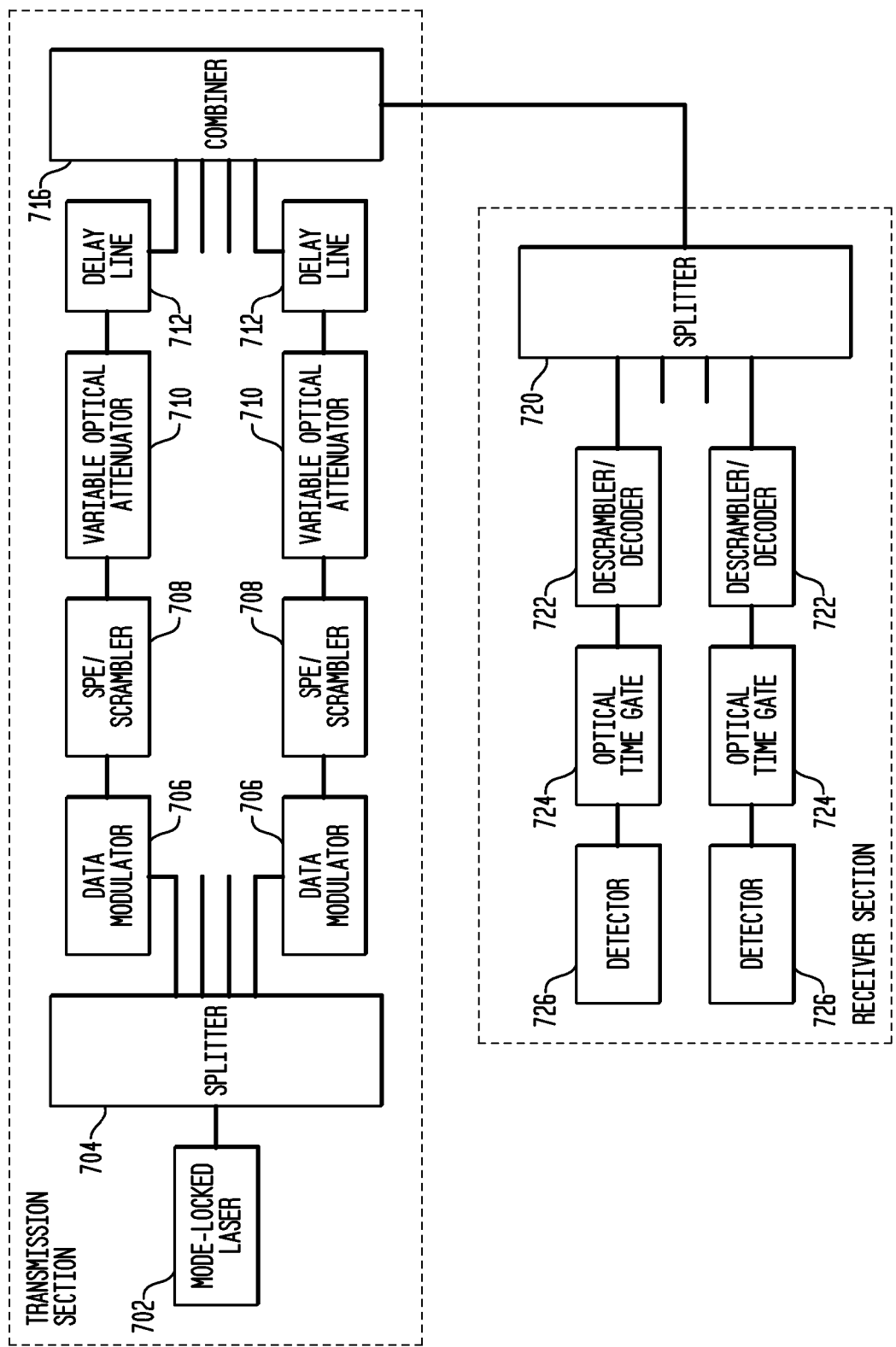

US 8,488,967 B2

SYSTEM AND METHOD FOR OCDMA-BASED PHOTONIC LAYER SECURITY ROBUSTNESS TO ARCHIVAL ATTACK

II. CROSS-REFERENCE TO RELATED APPLICATIONS

The present invention claims priority from U.S. Provisional Patent Application No. 61/075,979 filed on Jun. 26, 2008, the contents of which are incorporated herein by reference. Also, the present invention is a Continuation-in-Part of U.S. patent application Ser. No. 11/062,090 filed on Feb. 18, 2005 now U.S. Pat. No. 7,729,616, the contents of which are incorporated herein by reference. Moreover, the present invention is related to co-pending U.S. patent application Ser. No. 12/492,895 filed concurrent herewith on Jun. 26, 2009, the contents of which are incorporated herein by reference.

I. GOVERNMENT RIGHTS

The present invention was made with Government support under MDA972-03-C-0078 awarded by the Defense Advanced Research Program Agency (DARPA). The Government has certain rights in the present invention.

III. FIELD OF THE INVENTION

The present invention relates generally to optical networking, and more particularly to a system and method of providing security robustness against archival attacks in an optical CDMA-based photonic layer.

IV. BACKGROUND OF THE DISCLOSURE

The demand for bandwidth is scaling up to unprecedented levels. With the 100 Gb Ethernet (100 GbE) standard on the horizon, serial data communication rates will eventually outpace the single-channel capabilities of telecom transport interfaces. In five years, the transport of terabits of data generated from multitudes of data gathering and processing nodes, will need to be managed and delivered, on demand, to users at secure campuses. The cost-effective use of existing public dark fiber, i.e. unused installed fiber, and the emerging transparent reconfigurable optical add-drop multiplexer (ROADM)-based networks create a compelling case for photonic layer security (PLS) for high bandwidth needs where advanced encryption systems (AES) is not practical.

The success and widespread use of Code Division Multiple Access (CDMA) in the wireless domain has renewed interest in exploring the use of CDMA in the optical domain as well. However, optical CDMA (OCDMA) presents a very different set of challenges. Initially, these challenges included spectral efficiency, which is typically low in OCDMA, inter-symbol interference, and susceptibility to network impairments. Significant progress has been made since the start of a Defense Advanced Research Projects Agency (DARPA) sponsored program addressing the shortcomings of OCDMA. To the extent that spectral efficiency comparable to Wavelength-Division Multiplexing (WDM) networks is achieved, OCDMA networking has attractive features based on the underlying property that connectivity is managed through the use of codes like telephone numbers as compared with wavelength exchange in WDM networks.

Three distinct approaches have been the subject of much recent research, a potentially asynchronous time chips frequency bins or fast frequency hopping (FFH), a potentially asynchronous coherent time chips phase bins, and a synchronous coherent phase chips frequency bins or spectral phase encoding (SPE).

The attraction of SPE-OCDMA-based network lies in the prospect for providing security for multi-Gb/s data streams at the photonics layer. At the same time, concerns remain regarding quantifying the level of robustness of SPE-CDMA against eavesdropping. PLS offered by SPE-OCDMA has been historically viewed as security by obscurity, and thus the security robustness of SPE-OCDMA has been controversial since the theoretical paper by V. J. T. Shake entitled "Confidentiality Performance of Spectral-Phase-Encoded Optical CDMA," (published in *IEEE Journal of Lightwave Technology*, April 2005, pp. 1652-1663) and experimental analysis by Weiner et al. (i.e., "Experimental investigation of security issues in OCDMA: a code-switching scheme," *Elec. Lett.*, Vol. 41, No. 14, Jul. 7, 2005; and "Experimental investigation of security issues in OCDMA," *JLT*, vol. 24, pp. 4228-4234, 2006), which considered limitations of SPE-OCDMA security in a particular case.

The case considered in the Shake and Weiner et al. references is limited to a situation where a single channel is present, and as stated by Shake "allowing an eavesdropper to isolate individual user signals".

V. SUMMARY OF THE DISCLOSURE

In the present invention the vulnerability of SPE-OCDMA to eavesdropping is addressed by emphasizing the need for the presence of multiple channels for a successful phase scrambling technique that is the basis of the PLS. A publication, authored by the present inventors, detailing PLS, outlines for the first time the theoretical analysis that supports the robustness of phase scrambling to exhaustive search attack, and experimentally demonstrates the resistance of the disclosed PLS method to such attacks. The resilience of the PLS method to exhaustive search attack has been enhanced further by assigning multiple (quaternary) phase states to frequency bins. The usefulness of phase scrambling (also called phase masking) has also been confirmed in a conventional approach to SPE-OCDMA where the size of the search space can be increased due to the availability of many frequency bins.

In the present invention, a novel SPE approach to OCDMA is disclosed that is compatible with existing transparent reconfigurable optical networks, has high spectral efficiency, and is minimally affected by transmission impairments. The underlying technologies are based on the generation of stable combs of mode-locked laser (MLL) lines and the ability to access and change their relative phase with a resolution of ~1 GHz or better.

Essential to high spectral efficiency in any OCDMA system is the suppression of multi-channel interference (MUI). MUI rejection is accomplished in the present invention by adopting an orthogonal set of codes for modifying the relative phases of the MLL lines. The present invention uses a synchronous operation to push the MUI away from the central clock position and an optical time gating suppresses the MUI. The initial experimental results, performed during development of the present invention, demonstrated a 12.5% spectral efficiency (0.125 bit/s/Hz) using on-off keying modulation and bulk optics coders. However, with the development and use of optically integrated micro-ring resonator (MRR) phase coders, and DPSK modulation the present invention has demonstrated a 50% spectral efficiency. Moreover, the present invention, as described herein, has further increased the spectral efficiency to 87% with eight tributaries at 10 Gb/s each using FEC and DQPSK modulation technique.

To highlight the photonic layer security disclosed hereinbelow, the OCDMA concept has been extended to OCDM, where through inverse multiplexing different "channel" codes are assigned to all tributaries of a high-speed optical signal. The security of the high-speed signal then comes about from individual tributaries, all of which are present all of the time, obscuring each other.

An aspect of the present invention includes an optical system for transporting encrypted data. The optical system has a transmitter for transmitting an encrypted signal and a receiver for receiving and decrypting the encrypted signal. The transmitter includes a source for generating a sequence of optical pulses, each optical pulse having a plurality of spectral lines uniformly spaced in frequency with fixed absolute frequency and relative phase; a passive optical splitter for copying the sequence of optical pulses and outputting a plurality of channels, each channel being identical to the sequence of optical pulses; a plurality of data modulators, each associated with a respective channel of the plurality of channels, each data modulator modulating the respective channel using data to generate a modulated data signal; a respective spectral phase encoder coupled to each of the plurality of data modulators, the spectral phase encoder encoding respective modulated data signals using a plurality of mutually orthogonal phase codes that are individually associated with the respective spectral phase encoder; an optical combiner for combining the encoded data signals; and a spectral phase scrambler for code-scrambling the combined data signals using a scramble code as an encryption key to generate the encrypted signal.

The receiver includes a spectral phase descrambler for descrambling the encrypted signal signals using the scramble code as a key to generate a descrambled data signal; a plurality of spectral phase decoders for applying an inverse of the phase codes to the descrambled data signal to generate a decoded signal, each spectral phase decoder being a conjugate match to one of the respective spectral phase encoder; a respective optical time gate coupled to each of the plurality of spectral phase decoders, for time gating the decoded signal to isolate a desired data signal; and a demodulator coupled to the optical time gate for detecting and demodulating the desired data signal to retrieve the data.

Another aspect of the present invention is a method for transporting encrypted optical data. The method includes the steps of generating a sequence of optical pulses, each optical pulse having a plurality of spectral lines uniformly spaced in frequency with fixed absolute frequency and relative phase; copying the sequence of optical pulses and outputting a plurality of channels, each respective channel being identical to the sequence of optical pulses; modulating the respective channel using data to generate modulated data signals; encoding respective modulated data signals using a plurality of mutually orthogonal phase codes to generate a plurality of encoded data signals; and combining the plurality of encoded data signals; code-scrambling the combined plurality of encoded data signals using a scramble code as an encryption key to generate an encrypted signal.

VI. BRIEF DESCRIPTION OF THE DRAWINGS

These and other features, aspects, and advantages of the present invention will become better understood with regard to the following description, appended claims, and accompanying drawings wherein:

FIG. 3 illustrates a block representation of a micro-ring resonators (MRR) based coder in accordance with an embodiment of the present invention;

Figures 4A, 4B:
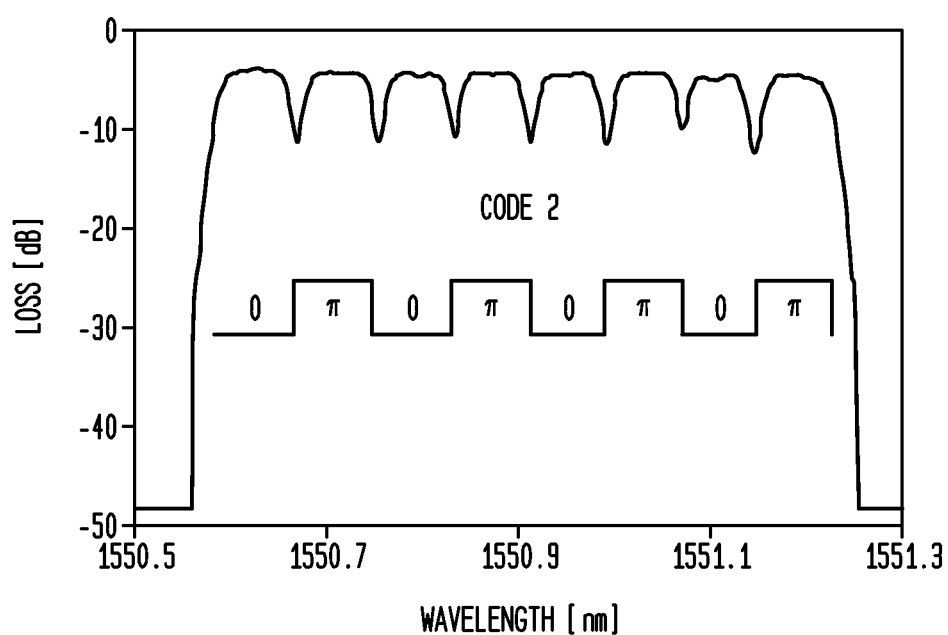
Figure 5:
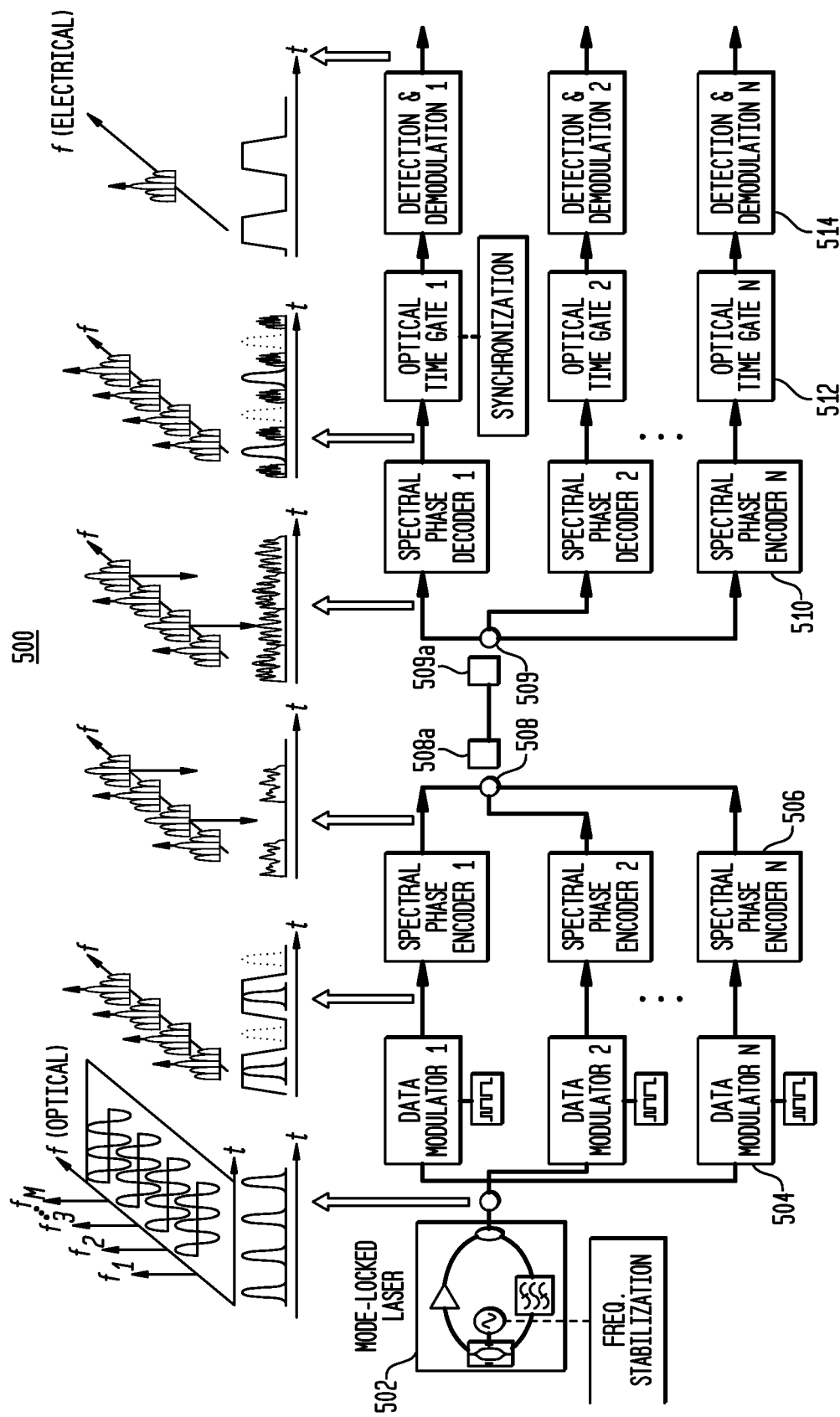
Figure 6:
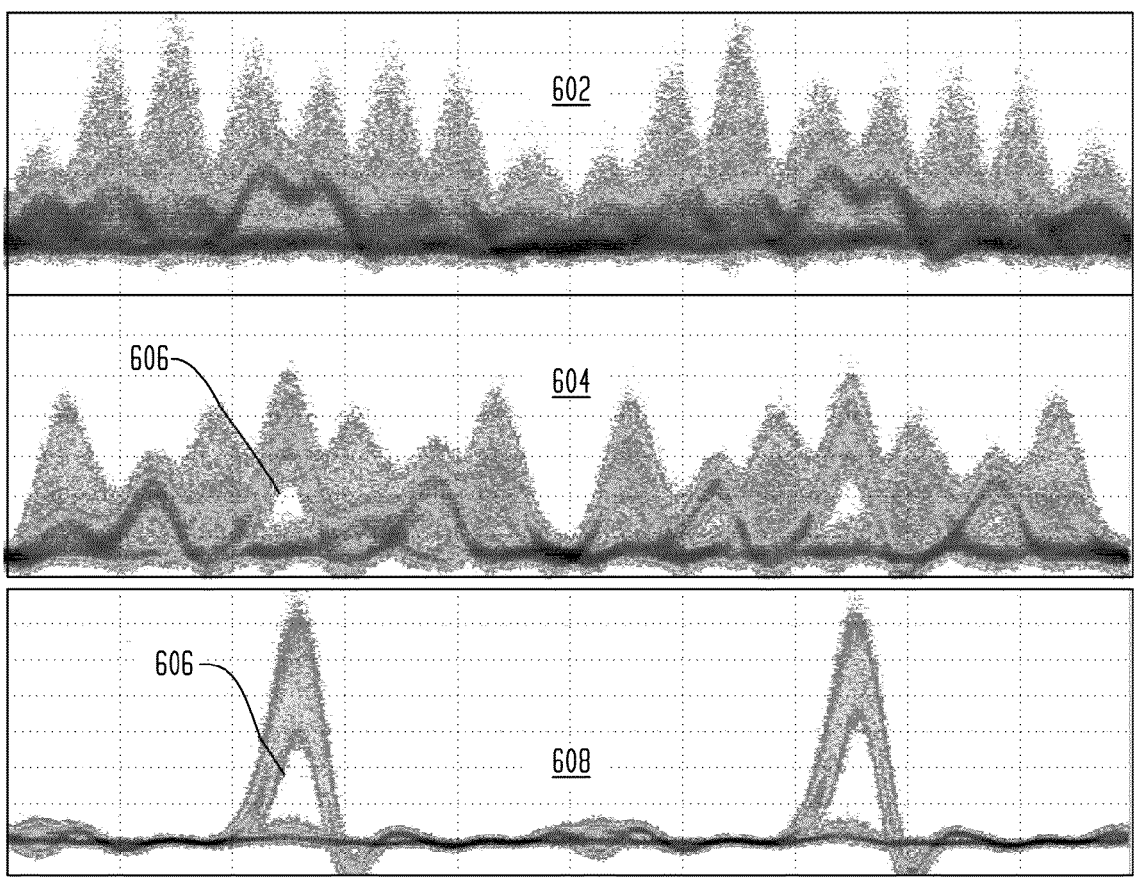

FIG. 4*a* illustrates a matrix representation of Hadamard-8 orthogonal codes in accordance with an embodiment of the present invention;

FIG. 4*b* illustrates a transmission spectrum of a coder after applying the Hadamard-8 codes shown in FIG. 4*a*;

FIG. 5 illustrates a block representation of a network system in accordance with an embodiment of the present invention;

FIG. 6 illustrates representative signals during three stages of an embodiment of the present invention;

FIG. 7 illustrates a block representation of another encoding/decoding system in accordance with an embodiment of the present invention.

VII. DETAILED DESCRIPTION OF DISCLOSURE

Coding and decoding are based on modifying the relative spectral phases of a set of well-defined phase-locked optical frequencies that are the output of a mode-locked laser. An embodiment of the present invention uses 8 or 16 equally spaced phase-locked laser lines confined to an 80-GHz window depending on the data rate for individual channels. Within the scope of the present invention, this 80-GHz window is considered to comprise 8 or 16 frequency bins, each bin being phase encode using a coder based on an ultrahigh resolution optical de-multiplexer.

Compared with the prior art SPE work that had used the very broad optical bandwidth of an ultra-short pulse source, the present invention has the advantage of coding individual frequency lines occupying a small tunable window. The narrower spectral extent of the coded signal in an embodiment of the present invention also limits the impact of transmission impairments, such as dispersion, and results in compatibility of the present invention with transparent WDM optical networks.

Figure 1:
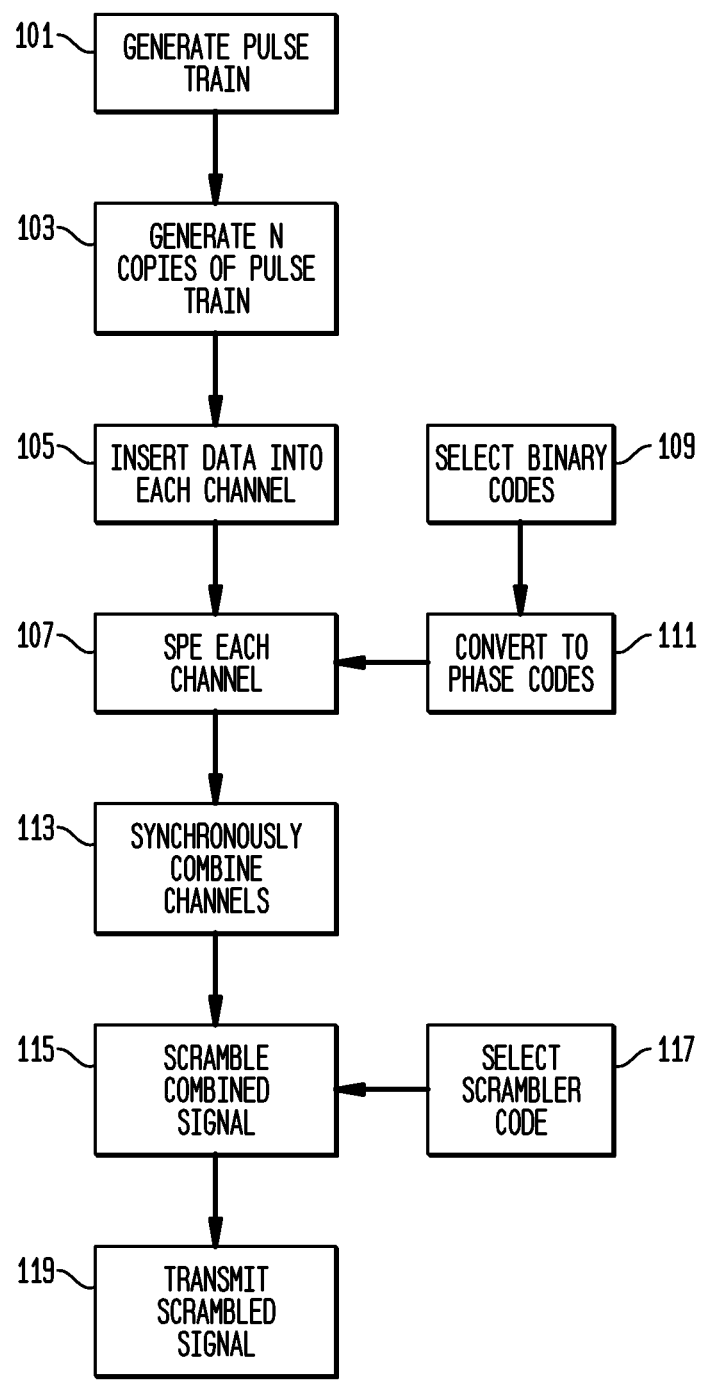
FIG. 1 illustrates a flow diagram of the process for performing signal encoding in accordance with an embodiment of the present invention.

The encoding process of an embodiment of the present invention, shown in FIG. 1, begins with generation of a train of short pulses using return-to-zero (RZ) line coding in step 101. The spectral content of the pulse train includes a stable comb of closely spaced phase-locked frequencies generated by a mode-locked laser (MLL), and have a frequency spacing equal to the MLL pulse repetition rate.

An example of an appropriate MLL for use in the present embodiment is a harmonic MLL commercially available from Calmar Opticom that has been modified to include a thermally stable Fabry-Perrot filter inside the cavity. As a result of the modification to the MLL, the comb stability has been reduced substantially to approximately 10 MHz over the duration of data taking. The MLL, as described, can be limited to a 80 GHz total spectral width using an optical band pass filter, and can be positioned spectrally within any desired WDM window by tuning the optical filter, or the coder. The phase-locked addition of these frequencies generates a pulse train with a pulse width of 12.5 ps, inversely proportional to the 80-GHz spectral width of the window. These pulses can subsequently be modulated to carry data.

The pulse train is passively split into a plurality of channels in step 103. Each of the channels is an identical copy of the pulse train and of each other. In step 105, each channel is separately and simultaneously modulated to embed data therein. Once modulated, each channel is spectral phase encoded in step 107. For example, in a simple illustrative case, the phase can be shifted by either 0 or $\pi$, as prescribed by the binary code selection in step 109. The selected binary codes are converted to phase codes in step 111, for example binary 0 is converted to phase angle 0 and binary 1 is converted to phase angle $\pi$.

The phase shifted channels are then temporally synchronized and passively combined to produce a coded signal in step 113. To further secure the data prior to transmission in the present invention, the coded signal generated in step 113 is scrambled using a spectral phase scrambler in step 115. The spectral phase scrambler applies a scramble code to the coded signal. The scramble code is generated in step 117 where a random phase setting is applied to phase codes. At this point, the signals are ready for transmission outside of a secured area in step 119. The process shown in FIG. 1 is performed simultaneously on all the channels. Each channel using an individual phase code for SPE and an individual scrambler code.

When the relative phases of the frequencies are shifted, the set of frequencies is unaltered, but recombination of the frequencies results in a different temporal pattern: e.g., a pulse shifted to a different part of the bit period, multiple pulses within the bit period, or more noise-like distribution of optical power. Each OCDMA code of the present invention is defined by a unique choice of spectral phase shifts. The set of codes are defined to make efficient use of the spectrum within a given window, and which can be separated from each other with acceptable error rates, even when a maximum number of codes occupy the window.

In the present embodiment, a set of Hadamard codes has been selected, which are orthogonal and binary. However, use of Hadamard codes within the present invention is intended for illustrative purposes only, and the present invention should not be construed as limited to only these codes. Binary Hadamard codes are converted to phase codes by assigning to +1's and −1's phase shifts of 0 and $\pi$, respectively. This choice is based on the goal of achieving high spectral efficiency with minimal multi-channel interference (MUI).

Unlike many optical coding schemes that have been proposed, the process in the present embodiment offers true optical orthogonality, in the sense that MUI is zero at the time that the decoded signal is at a maximum. The number of orthogonal codes is equal to the number of frequency bins; and if all codes were used, high spectral efficiency is possible.

After data modulation, the initial comb of frequencies produced by the MLL is spectrally broadened by the spectral content of the modulating data. Thus, it is necessary to define frequency bins centered on each of the MLL frequencies. Encoding the data-modulated signal then consists of applying the phase shift associated with a frequency to the entire bin. The output of the phase encoder is then a signal obtained by summing the phase-shifted frequency components of the modulated signal, or equivalently, by convolving the modulated optical signal at the input of the phase encoder with the inverse Fourier transform of the phase code.

Applying any of these orthogonal codes (except for the trivial case of Hadamard Code 1, which leaves all phases unchanged) results in a temporal pattern which has zero optical power at the instant in time where the initial pulse would have had its maximum power. Decoding is accomplished by using a matched, complementary code. For simplicity the binary codes used herein are there own complements, and consequently the coder and decoder are identical. The decoded signal has the pulses restored to their original position within the bit period and restores the original pulse shape.

The repetition rate of the MLL is an inverse of the frequency bin spacing and the pulse duration is an inverse of the window size. Decoding using an incorrect decoder results in a temporal pattern that again has zero optical power at the center of the bit period and the majority of the energy for that pulse is pushed outside the time interval where the desired pulse lies. The desired decoded signal can then be separated from all other channel signals by appropriate optical time gating.

Although this choice of orthogonal codes implies synchrony as a system requirement, since de-synchronization will move unwanted optical power into the desired signal's time slot, careful code selection allows some relaxation of this requirement. Simulations indicate that for four simultaneous channels transmitting at 2.5 Gb/s and using a suitably chosen set of four codes among the set of 16 Hadamard codes of length 16, up to 15 ps of relative delay can be tolerated with a power penalty within 1 dB at a BER of 10-9. Better resiliency to asynchronism may be achieved by using multiphase codes.

Figure 2:
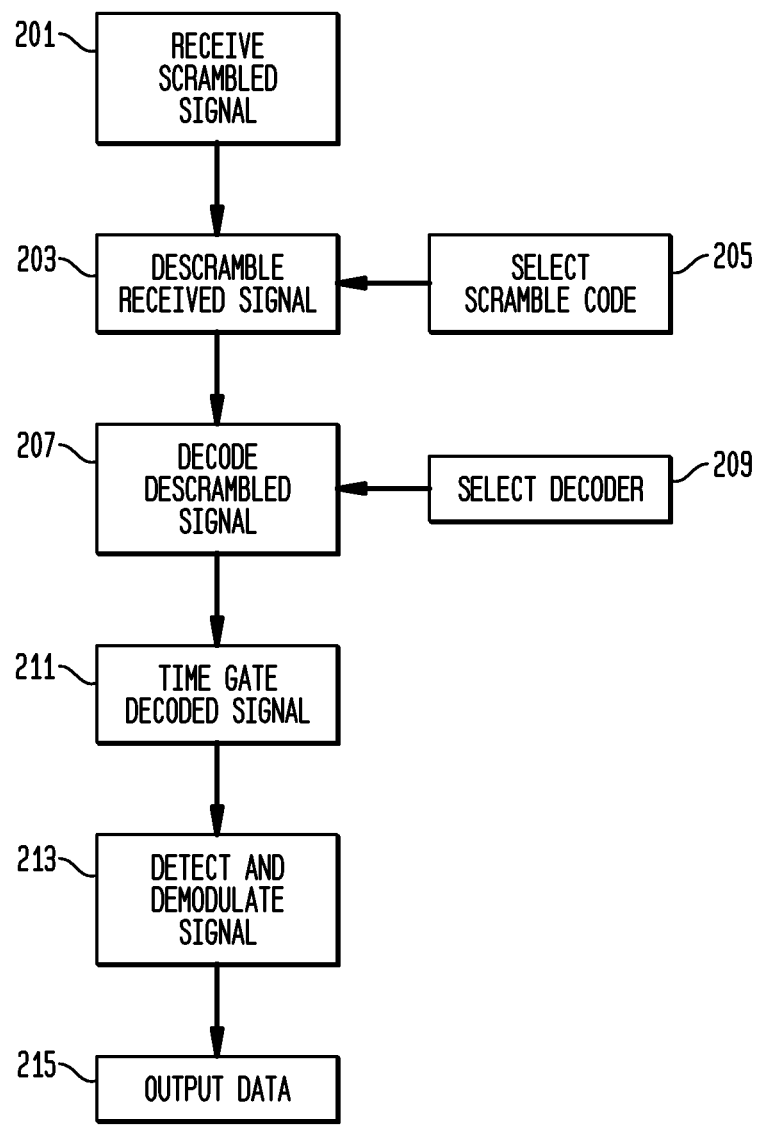
FIG. 2 illustrates a flow diagram of the process for performing signal decoding in accordance with an embodiment of the present invention.

FIG. 2 shows the general steps involved for decoding a signal received from the encoding method shown in FIG. 1. A scrambled signal is received in step 201. In step 203, the signal is descrambled using a spectral phase descrambler. The spectral phase descrambler selects a scramble code in step 205 that is the compliment of the code used to scramble the original signal in step 115 of FIG. 1. Generally speaking, the scramble code can be considered a private key analogue, similar to private keys known in the art of digital data encryption. The descrambled signal is decoded in step 207 using a spectral phase decoder that applies a compliment of the phase codes used in the encoding process (step 107 of FIG. 1). The phase codes used in step 207 are dependent on the decoder selected in 209.

Once decoded, the signal is then passed through an optical time gating device in step 211 in order to isolate the decoded signal from all the other signals. The decoded signal corresponds to one of the channels discussed above, thus in step 213 the decoded channel is detected and demodulated to extract the embedded data. At this point the extracted data is ready for output in step 215.

Implementation of SPE-OCDMA

High-resolution manipulation of the optical phase has been achieved interferometrically by bulk optics and through optically integrated micro-ring resonators (MRR). The MRR technology is compatible with optical integration, making it advantageous for reducing cost as well as creating novel functionalities for optical signal processing. FIG. 3 shows the optical circuit for the MRR-based coder 300 used in an embodiment of the present invention. The coder 300 consists of a number of stacks 308 of 4 rings 306. Each stack 308 is, in turn, coupled to an input bus 302 and an output bus 304.

Each stack 308 can be tuned thermally to any one of the MLL lines and their arrangement ensures that all lines experience the same optical path length. Phase shifters 310 based on thermal expansion are placed between the stacks 308. These phase shifters 310 change the optical paths encountered by different wavelengths, thus altering the phase of the wavelength.

FIG. 4a shows a matrix representation of Hadamard-8 orthogonal codes. The 0 and $\pi$ phase shifts are represented by +1 and −1, respectively. Each row (or column) represents a code that is orthogonal to every other row (or column). FIG. 4b shows the transmission spectrum of a coder when it is set to code 2 of the Hadamard-8 set of codes, with $\pi$ phase shifts between neighboring frequency bins as shown in the inset. The low fiber-to-fiber insertion loss of ~4 dB is mostly attributable to the coupling to input-output fibers. The flattop and sharp drop at the bin edges are the result of the high quality of the MRR.

FIG. 5 shows system architecture 500 of an embodiment of the present invention. The RZ pulsed output of the MLL 502 is shared by all channels each with its own data modulator 504 followed by its respective Spectral Phase Encoder (SPE) 506. The SPE 506 spreads the pulse energy from the center of the bit interval. A delay line ensures that all channel signals enter the fiber combiner 508 in synchrony. The plots at the top of FIG. 5 show time and frequency representations of the signal at the positions marked by the vertical arrows. Prior to exiting the secure area, the combined signal passes through a spectral phase scrambler 508a, which scrambles the combined code using a private key (i.e., scramble codes), thus providing a further layer of encryption to the transmission.

On the receiving side of the network, the now encrypted signal is received by a spectral phase descrambler 509a. The spectral phase descrambler applies the private key to the scrambled signal, thus descrambling the signal. The descrambled signal is multiplexed at an optical multiplexer 509 (such as a beamsplitter). Each of the signal copies is processed by a spectral phase decoder (SPD) 510. The SPD reassembles the pulse at the center using an orthogonal set of codes to minimize the energy from other channel signals in the sampling window. Use of the orthogonal codes coupled with time gating provided by the Optical Time Gate (OTG) 512, suppresses multi-channel interference. The OTG 512 isolates the decoded signal form the remaining signals in the signal copy. Once the signal has been decoded and isolated, a detection and modulation unit 514 extracts the data embodied in the signal.

FIG. 6 shows the combination of four encoded signals in the plot referenced as 602, and a decoded signal in the presence of three other codes (channel signals) is shown before gating in the plot referenced as 604. In plot 604, an area referenced as 606 shows a region of low error. This area is termed an eye, thus in the pre-gating plot 604, the eye is beginning to open (become discernable). However, after gating, the optical power associated with the interfering channel signals is present but is displaced in time from the decoded data, as seen in the post-gating plot 608. In plot 608, the eye 606 is significantly more defined, thus after the gating process, the decoded signal is easily separable from the interfering channel signals.

As a result, in the presence of multiple channels, the present invention uses optical time-gating provided by, for example, an semiconductor optical amplifier (SOA)-based Terahertz optical asymmetric de-multiplexer (TOAD). The optical time gating extracts the desired, correctly decoded pulse, and identifies and extinguishes the remaining multi-channel interference, resulting in the plot referenced as 608.

WDM Compatibility

Emerging networks that are optically transparent can, in principle, allow for a variety of signal types, modulation formats, and bit rates to be transported over a common infrastructure. The present invention provides compatibility with conventional WDM networks.

As described in detail earlier, the present invention utilizes coherent spectral phase encoding and decoding of a tightly spaced comb of phase-locked wavelengths. In comparison to phase coding approaches known in the art, the present invention applies a specific spectral phase component to each distinct line of the multi-wavelength comb rather than to multiple lines. In addition to confining a modulated MLL line to the center of a frequency and avoiding bin-edge overlap problem, the present invention allows for minimization of the spectral width of the OCDMA signal while still allowing for a larger code set, or potentially a greater number of channels. For example, using ultra-fine filtering technology in the embodiments described above, up to 16 distinct spectral phase components can be applied at a 5 GHz granularity. Therefore, the multi-channel composite OCDMA spectrum is confined to approximately 80 GHz, which is compatible with filtering and transmission components commonly used for conventional DWDM systems aligned to either a 100 GHz or 200 GHz ITU grid.

In the remainder of this section, experimental results are presented demonstrating compatibility of the present invention with a transparent reconfigurable optical network that is simultaneously transporting conventional DWDM signals, both in another and in the same WDM window. The set up utilizes a multi-wavelength transparent DWDM network similar to the Advanced Demonstration Technology Network (ADTNet). This network is designed on a 200 GHz channel grid and can dynamically reconfigure the ~150 GHz optical pass bands across the network.

For the OCDMA channels, a multi-wavelength signal is first generated using a mode locked laser (MLL1) operating at a 5 GHz repetition rate, which produces a comb of phase-locked wavelengths spaced on a 5 GHz grid and spanning over 100 GHz. By filtering the spectrum to approximately 80 GHz, a continuous stream of ~12.5 ps pulses results in the time domain. These pulses are then data-modulated at 2.5 Gb/s using independent Mach-Zehnder modulators (MZM) for each O-CDMA channel. Each channel is assigned one of a set of mutually orthogonal 16-element spectral phase codes. The encoded signals from the two OCDMA channels (which each occupy the same ~80 GHz bandwidth) are then passively combined and added to a single WDM channel on the optical network using a reconfigurable optical add/drop multiplexer (ROADM). In addition to the two OCDMA channels, an additional 6 WDM channels are also added to the network as well as a second primary reference synchronization MLL, which provides a global synchronization reference throughout the network. The composite optical signal is transmitted to a second ROADM over a 25-km SMF fiber link followed by the appropriate dispersion compensation.

At the second ROADM, the conventional WDM channels as well as the OCDMA signals are dropped from the network. The dropped OCDMA signals are clearly difficult to resolve individually due to the encoding process. The OCDMA data signals are then sent to an OCDMA receiver, which consists of a spectral phase decoder and SOA-based interferometric optical time gate (OTG). The OTG filters out multi-channel interference by temporally extracting only the desired channel using the dropped primary reference laser signal for synchronization. The desired data channel is faithfully recovered.

Finally, at this point, a commercially available OC-48 optical receiver, or other appropriate optical receiver, is used to convert the RZ pulse stream into a 2.5 Gb/s NRZ electrical signal. Data transmission over the above network has been demonstrated with a 1 dB power penalty compared to the back-to-back configuration.

Intra-WDM compatibility of the present invention can be exploited for taking advantage of unused capacity and/or delivering multilevel security in a given WDM window. The OCDMA systems of the present invention described to this point have had the phase-locked comb frequency line contiguous within the DWDM window. However, because of the phase coherence between the comb lines, it is possible to perform phase coding on disjointed comb lines. This possibility allows the present invention to simultaneously transmit multiple OCDMA channels and a conventional OOK channel within the same ITU window. The phase encoded CDMA offers the unique capability of conveying broadband signals over non-contiguous frequency bands, thus allowing the transmission of several OCDMA channels in the unused bandwidth of a single WDM channel where the SONET signal is actually present. The experimental confirmation that spread spectrum signals can be conveyed over disjointed frequency bands, demonstrate a truly OCDMA-overlaid WDM system.

For the experiments demonstrating the performance of disjointed frequency bins, suitably modified two coder phase masks are used in order to also allow for insertion of an OC-192 SONET signal in the middle of the set of MLL lines. In particular, the phase mask is modified in order to allow for: 1) de-multiplexing of 20 MLL lines (a total pass-band of 100 GHz); 2) phase encoding of the first 8 and the last 8 MLL lines using Hadamard codes of length 16; 3) notching of the 4 central MLL lines. This creates a 20 GHz "spectral hole" in the middle of the OCDMA band. Short dips in the frequency response arise from destructive interference caused where two adjacent frequency bins differ in phase by $\pi$. The purpose of creating this "spectral hole" is to allow for the insertion of a 10 Gb/s OOK signal. It is worth pointing out that the disclosed OCDMA system is spectrally spreading channels over a band characterized by a non-contiguous frequency range. It is also worth noting that, despite the disjointed frequency range, the orthogonality of the two Hadamard codes is fully preserved. At comparable powers for an OOK and two OCDMA signals, the results show negligible effect from OOK signal on the OCDMA and 1 dB power penalty on the OOK signal when two OCDMA signals occupy the same WDM window.

OCDMA-Based Photonic Layer Security

The present invention is easily extendable to OCDMA-based photonic layer security and applications that can support where digital encryption is not a possibility. In any case, PLS is not always intended to replace the conventional digital encryption, but it can complement and augment it. It can be effectively applied in a "nested encryption" capability that avails itself where needed. However, in the coming five years period, PLS may be the only cost-effective means that can provide secure communications for bandwidths in excess of several terabits for applications, such as, multimedia "virtual theaters" and "on-demand grid-based supercomputing".

Since orthogonal codes are used herein, the maximum number of simultaneous channels is equal to the number of frequency bins. Coders have been constructed for use in the present invention with 16 bins, and can be extend to 32 bins. Consequently, the coders are capable of supporting 16 or 32 codes. The current limitation on the maximum number of frequency bins comes from the ability to remove heat used for phase adjustment and frequency tuning of the micro-ring resonators. For Hadamard codes of order N ($H_N$) number of possible orthogonal code states so generated is N. An eavesdropper equipped with an adjustable decoder would have to guess only on the order of N possible code settings in order to tune in on any given transmission. For increased data obscurity/scrambling, it would be desirable if the eavesdropper were required to search through a far larger number of possible codes.

A useful technique for increasing the space of code states of a set of orthogonal codes is to apply an orthogonal matrix $W_N$ generated from $H_N$ by pre-multiplying by a monomial matrix $M_N$ of order N (a monomial matrix in a matrix in which there is only one non-zero element in each row and in each column) where the non-zero elements are arbitrarily chosen phase shifts. An interesting special case of a monomial matrix $M_N$ is a diagonal matrix $D_N$ of order N with all of the on-diagonal elements being arbitrarily chosen phase shifts. In the context of the present invention, the general pre-multiplication process is referred to as code-scrambling and the monomial or diagonal multiplier as the scrambling code. Scrambling based on a diagonal matrix is an interesting special case because such scrambling can be implemented in shared physically separate SPE scramblers and descramblers as shown in FIG. 5. For the more general monomial case, the scrambled codes $W_N$ themselves must be implemented in the individual phase encoders/decoders as shown in FIG. 7, but monomial scrambling significantly increases the number of scrambler settings.

In other words, when random phase settings corresponding to the scrambling code are imposed upon all the conventional Hadamard codes, a new set of N distinct orthogonal codes is produced, referred to here as the modified Hadamard codes. Each panel is the simulated temporal intensity variation for two bit periods as might be seen by an eavesdropper. The left panel shows the result of encoding with the original Hadamard-32 codes 6, 7, 9, and 12. The spiky nature of the patterns and their discrete appearance in the time domain would appear to render the codes vulnerable to detection by an eavesdropper.

However, using the corresponding set of scrambled Hadamard-32 results in a substantially different time-dependent signal. The modified Hadamard-32 has been created by a diagonal scrambler using random 0 and $\pi$ phase shifts for each element. Using this technique, not only suppresses the peak amplitude of the variation, but the energy in a bit is now spread throughout the bit period. This degree of signal obscuration coupled with the potentially large number of possible scrambler states and the ability to dynamically change the scrambler code setting at will all contribute to the obscurity of the composite signal. The large code space makes eavesdropping by exhaustive search for the scrambler key a practically impossibility in a brute force attack.

The basis for an optical communication channel that is secure for all practical purposes results from the inability of an attacker to guess the descrambling code before the code is changed by the channels. While there are still only N distinct orthogonal codes available at any one time, the number of possible $W_N$ code configurations is governed by the number of different arbitrarily chosen scrambler matrices that can exist and that number can be quite large. For the case of a diagonal scrambling matrix with p possible phase states at each of the N diagonal elements, the number of distinct $D_N$ matrices is $p^N$. For example, a case with N=32 and p=4 possible phase states, the number of distinct $D_N$ matrices is $4^{32}$ (~$10^{18}$). Invoking the more general monomial scrambling brings an N! increase in this number. The claim of robustness of the PLS approach lie in the analyses of the numbers involved: assuming a 1000 bits of low temporal resolution time trace needed to look for opening of an eye by changing different phase settings, one needs 10000 flops of a teraflops computer per guess of the setting. Considering the $10^{18}$ possibilities, that translates to a very long time to identify an eye and start the process of decoding the signal compared to the short time required to change the phase settings. The search space can be made larger if a monomial matrix is used in addition to the scrambling diagonal matrix to create the orthogonal modified codes.

$$D_N H_N = W_N \begin{vmatrix} -1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & -1 & 0 & 0 & 0 \\ 0 & 0 & 0 & 0 & 0 & 1 & 0 & 0 \\ 0 & 0 & 0 & 0 & 0 & 0 & -1 & 0 \\ 0 & 0 & 0 & 0 & 0 & 0 & 0 & -1 \end{vmatrix} \times$$

$$\begin{vmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{vmatrix}$$

$$= \begin{vmatrix} -1 & -1 & -1 & -1 & -1 & -1 & -1 & -1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ -1 & -1 & -1 & -1 & 1 & 1 & 1 & 1 \\ 1 & -1 & 1 & -1 & -1 & 1 & -1 & 1 \\ -1 & -1 & 1 & 1 & 1 & 1 & -1 & -1 \\ -1 & 1 & 1 & -1 & 1 & -1 & -1 & 1 \end{vmatrix}$$

Code scrambling is achieved by applying a common random phase setting to the original Hadamard phase codes $H_N$. The elements of the scrambler phase settings can have any arbitrary phase shift ($\phi$) between [0, $2\pi$]. The concept is illustrated in the following matrix: The matrix, above, uses a Hadamard-8 as the scrambling code $D_N$, represented as a diagonal matrix. The scrambled codes $W_N$ are found in the columns of the resulting matrix product. In this example, a diagonal scrambling code $D_N$ was constructed using binary phase shifts 0 and $\pi$ only. The [1,−1] elements of the codes are represented in terms of the phase shifts as $e^{i\phi}$, where 1 and −1 indicate phase shifts of zero and $\pi$, respectively. Since the coders can be configured with arbitrary spectral phase settings, they can be used for de/encoding and de/scrambling operations by applying the appropriate phase codes.

As mentioned previously, the total number of possible scrambling codes, which determines the total number of possible modified Hadamard code configurations, is given by $p^N$ for a diagonal scrambler where p is the number of phase states and N is the number of spectral components. For example, in a setup with two-phase states of 0 and $\pi$, and N=8, the total number of possible scrambling codes is $2^8$. The example shown in the above matrix uses only one particular scrambling code out of the possible $2^8$ choices, resulting in one realization of orthogonal modified Hadamard codes. The scrambling code can be viewed as the secret key used in conventional secure communications. With the scrambling code hidden from an eavesdropper the possible search space for guessing the code settings becomes exponentially larger than the conventional N Hadamard codes.

The scrambler (descrambler) corresponding to $D_N$ can be implemented in a physically separate SPE while the channels continue to use $H_N$ for encoding or decoding. Alternatively, the scrambler (descrambler) and encoder (decoder) can be combined and implemented in a single SPE directly using the columns of $D_N$. Given a situation where a group of OCDMA channels is used to send data to a common destination, it is advantageous to separate the two functions so that all channels share one scrambler thereby simplifying the synchronization of scrambler code changes. However, the $D_N$ codes can be implemented directly in each coder unit.

The scrambling spreads the energy of the pulse more uniformly over the pulse interval, thus reducing the peak powers. Once encoded, the signal can be descrambled and then decoded to recover the original pulse in the correct time-slot by applying a matched spectral phase code. Conversely, incorrect decoding leaves the energy of the pulse distributed away from the central position at which the correctly decoded signal is at its peak. Effective scrambling for enhanced confidentiality requires multiple codes to operate in parallel.

An embodiment of the present invention is shown in FIG. 7 for demonstrating OCDMA-based PLS. It should be noted that while FIG. 7 shows two paths in both the transmission section and receiver section, in actuality the embodiment shown in FIG. 7 is constructed of any plurality of paths. Therefore, for simplicity the present embodiment will be described from the stand point of two encoding and decoding paths. The output of a 10 GHz MLL 702 is split into two separate paths by a splitter 704. Each path is independently modulated by 5 Gb/s data streams consisting of $2^{15}-1$ pseudorandom bit sequences (PRBS) in the data modulator 706 to generate two independent OCDMA signals in a single polarization. The modulated signals are then encoded in respective spectral phase encoder/scrambler 708. The two encoded signals are scrambled using a randomly chosen scrambling code, for example [−1, 1, 1, 1, −1, 1, −1, −1]. The power of each of the scrambled OCDMA signals is equalized by variable optical attenuators 710, and connected to fiber delay lines 712 for synchronization. The output from the delay lines 712 are then passively combined at a combiner 716. In this embodiment, all channels occupy the same 80 GHz (8 frequency bins×10 GHz) spectral bandwidth, making this system compatible with existing WDM systems.

At the receiver, a splitter 720 passively splits the incoming signal into a plurality of identical copies of the incoming signal. A decoder 722 is configured to correctly descramble and decode either of the two OCDMA signals by selecting the corresponding phase code. An optical time gate 724 rejects the multi-channel interference by extracting the desired decoded channel from the remaining incorrectly decoded signals. A detector 726 detects the decoded channel from among the plurality of channels in the signal and demodulates the channel, extracting the data.

In FIG. 7, the encoding (decoding) and the scrambling (descrambling) operations are shown as being performed in a single coder, however, the encoding and scrambling may be implemented in separate devices.

Apparatus shown in FIG. 7 can be readily modified in the context of two 5 Gb/s tributaries in each polarization resulting in four 5 Gb/s tributaries of a 20 Gb/s data stream once polarization multiplexed by a polarization beam splitter (not shown). The only additional care is to ensure that the arrival of each tributary in the fiber is within the same bit period using integrated delay lines. Alternatively, such time compensation can be done electronically after the detection of each tributary.

Resilience to archival attack arises from the need for an eavesdropper to record the coded data with vastly higher time, amplitude, and optical phase resolution than the authorized user needs to employ. For example, if an eavesdropper attempts to record a scrambled waveform, for post processing, he would need to measure the optical field of the complex signal, which would need to be recorded in real time with temporal resolution at least 16 times that needed to receive the decoded data and with analog (as opposed to digital) amplitude sampling. The high-speed temporal sampling requires a much higher-bandwidth receiver, which will introduce significantly more noise, corrupting the analog measurement of the signal amplitude. An effort to capture the different lower-bandwidth signals on each MLL frequency will reduce the requirement for temporal resolution but at the expense of multiple parallel measurements, which must be synchronized to sub-nanosecond timescales.

Deployment of OCDMA-Based PLS

A deployment scenario of the present invention consists of two secure areas within which OCDMA coding would be used for signal routing/addressing purposes. However, before these signals leave the secure areas, they would be scrambled by passing through a shared scrambling stage. At the entrance to the secure area received signals would be collectively descrambled and finally decoded by the end user. This architecture satisfies obscurity conditions for practically secure, point-to-point transmission by precluding access to any single code. Specifically, it must be assumed that the groups of codes leaving the secure areas are always sent simultaneously, as would be the case if a large bandwidth signal were being sent as multiple sub-rate data streams on several codes in parallel.

Inverse multiplexing can be used to reach 100 GbE. The key aspect of inverse multiplexing is that either all codes (for example four codes) are simultaneously in use or none are; and when the codes are present, they form a self-obscuring group. The role of the scramblers, which apply an arbitrarily chosen set of phase shifts to the ensemble of codes, is to present an eavesdropper with a very large search space if he is to guess the phase codes in use. Ideally, the state of the scrambler is updated on a regular basis in synchronized fashion at the two ends of the link.

Multilevel Security

Multilevel security has been used in both military and commercial arenas where over the same transmission medium such as optical fiber, communication channels with different levels of security coexist. For example, in a DWDM network additional security for a given channel is provided by digital electronic encryption. Therefore, secure channels are protected from inadvertent or malicious access to their data.

Compatibility with DWDM networks is utilized in the OCDMA scheme of the present invention to provide multilevel security. A use of the OCDMA-based PLS described above is for multilevel security for avionics applications where space, weight, and power (SWaP) are of prime importance. Currently, dedicated fibers are used in order to provide multilevel security. Recent efforts to standardize WDM networking to limit the excessive use of fiber infrastructure are a welcome improvement. However, in order to provide multilevel security digital encryption has to support designated channels. The OCDMA-based PLS of the present invention is an all-optical means that can readily be incorporated because of the availability and the SWaP figure of merits.

A set of AES signals can be transported on an OCDMA system as a means of denying an eavesdropper ready access to the digital cipher text bits and thereby frustrating an archival attack. AES creates an initial state $D \oplus K_0$ by computing the XOR sum of the data D and round key $K_0$. AES then performs three operations on $D \oplus K_0$: a non-linear substitution followed by row shift and column mixing. This is repeated for 10 to 14 iterations, depending on key size. Each round requires a key created through key expansion.

OCDMA encryption performs analogous operations in a single pass. Each of n data bits modulates a set of m coherent MLL lines. This represents an m-fold expansion of the signal bandwidth, whereas AES operates with essentially the same fixed bandwidth as the plain text signal. The seeming loss in spectral efficiency represented by this expansion is recovered by the ability to transport several differently encoded signals in this same bandwidth.

A set of orthogonal signals is created by applying a Hadamard phase mask to each set of modulated MLL lines. State mixing is first accomplished by combining the orthogonal signals, which remain separable via the Hadamard coding. A keyed pseudo-random phase rotation is finally performed on each wavelength of the mixed signal, which creates mixed, but still mutually orthogonal, states that are no-longer separable by a Hadamard phase mask. While separable states can be recovered by a complementary set of keyed phase rotations, further mixing occurs when the phase rotation is improperly corrected by an eavesdropper. Sampling that is the result of time gating constitutes one of the non-linear operations in OCDMA "encryption". The OCDMA system of the present invention is linear in the fields, but ordinarily the intensities have to be measure using a square law detector. Therefore, the measured signal is nonlinear to the injection of coherent noise created by multi-channel interference (MUI) in the gated time interval. The role of this "analog-based" nonlinearity as opposed to the digital-based nonlinearly in providing PLS is currently under investigation.

Comparison with Ongoing Alternative Research

Currently there are two spectral phase-scrambling based approaches to PLS, OCDMA as described herein and an approach, which relies on the ability to slice the spectral content of a single-channel modulation-broadened laser spectrum with ultrahigh resolution and applies phase scrambling to individual spectral slices, referred to hereinafter as "Essex approach".

In the Essex approach, a typical 10 Gb/s ON-OFF modulated optical signal occupying a bandwidth of approximately 20 GHz is partitioned using a spectral phase mask into roughly 128 different bins and a random phase shift is applied to each spectral bin. Each bin has a spectral width on the order of 0.16 GHz (for comparison, in the OCDMA PLS approach of the present invention, the width of the phase bins are on the order 5-10 GHz). At the receiver, a conjugate phase mask is applied to restore the signal spectrum to its original state and thereby recover the original digital signal. The high-resolution of the phase mask translates into an optical impulse response that is tens of times longer than the bit interval of the original signal. The phase mask thereby gives rise to considerable inter-symbol interference (ISI), obscuring the original single-channel signal.

The "secret key" in the Essex approach describes the state of the random phase mask much as the OCDMA system relies on "secret" scrambler spectral phase masks. A difference between the Essex encoder and the OCDMA PLS system of the present invention is that the former operates on a single, modulated optical signal to introduce large ISI on an individual channel whereas the OCDMA system operates on an inverse-multiplexed combination of several orthogonally encoded signals that coherently interfere to obscure one another.

The ability to recover the original signal from the encoded version relies on the fidelity with which the product of the encoder and decoder spectral phase masks approaches unity across the signal bandwidth. However, one critical but unavoidable consequence of spectral phase encoding is the presence of a pattern of intensity dips in the transfer function of encoders and decoders wherever the phase of two adjacent bins differs. The intensity dips can result in complete cancellation of the signal spectrum near bin edges where the phases of two adjacent bins differ by $\pi$. Such dips can be seen in the spectral response of the coders used in prior OCDMA systems.

For comparison, while the OCDMA encoders described earlier also exhibit these intensity dips, the number of bin edges here is far smaller (8-16 versus 128). In principle, the pattern of intensity dips can reveal information about the scrambling key. However, when multiple codes are simultaneously present, the absence of a dip in one code can cover the dip in another code. More importantly, the data modulation is designed such that little power is placed near the bin edges of the signal spectrum, further obscuring phase-mask-induced intensity dips. Such tailoring of the data modulation is not possible with the single-channel Essex approach.

In addition to the spectral phase encoding approaches discussed, there are other PLS techniques that effectively apply phase modulation in the time domain instead of the frequency domain. For example, consider a single-channel approach originally developed by Northwestern University and often referred to as Alpha Eta. In a typical phase-based implementation, a pseudorandom M-ary phase rotation is temporally applied on a bit-by-bit basis on the top of a transmitted DPSK signal. An intended receiver, who holds a proper decoding key, applies the proper conjugate rotation, allowing it to make a nearly optimal binary decision on the bit value. In contrast, an eavesdropper without the proper key is placed at a significant disadvantage in terms of detecting the more complex M-ary signal. One of the uniqueness of the Alpha Eta approach is that by limiting the initial transmitter power to appropriate levels and having sufficient number of phase states, the Alpha Eta approach can force the eavesdropper to be in a quantum noise-limited detection regime. Prototypes of Alpha Eta have already been demonstrated at speeds and distances that approach those of interest for real-world systems. For example, in transmission at 622 Mb/s has been demonstrated over distances up to 850 km on the BoSSNET research link, and the experiments have shown some of the requirements that would enable a network to support this format.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An optical system for transporting encrypted data, the optical system comprising:
  a transmitter for transmitting an encrypted signal, the transmitter including:
    a source for generating a sequence of optical pulses, each optical pulse having a plurality of spectral lines uniformly spaced in frequency with fixed absolute frequency and relative phase;
    a passive optical splitter for copying the sequence of optical pulses and outputting a plurality of channels, each channel being identical to the sequence of optical pulses;
    a plurality of data modulators, each associated with a respective channel of the plurality of channels, each data modulator modulating the respective channel using data to generate a modulated data signal;
    a respective spectral phase encoder coupled to each of the plurality of data modulators, the spectral phase encoder encoding respective modulated data signals using a plurality of mutually orthogonal phase codes that are individually associated with the respective spectral phase encoder;
    an optical combiner for combining the encoded data signals; and
    a spectral phase scrambler for code-scrambling the combined data signals using a plurality of scramble codes individually associated with the respective channels as encryption keys to generate the encrypted signal; and
  a receiver for receiving and decrypting the encrypted signal, the receiver including;
    a spectral phase descrambler for descrambling the encrypted signal signals using compliments of the plurality of scramble codes as decryption keys to generate a descrambled data signal;
    a plurality of spectral phase decoders for applying an inverse of the phase codes to the descrambled data signal to generate a decoded signal, each spectral phase decoder being a conjugate match to one of the respective spectral phase encoder;
    a respective optical time gate coupled to each of the plurality of spectral phase decoders, for time gating the decoded signal to isolate a desired data signal; and
    a detector coupled to the respective optical time gate for detecting and demodulating the desired data signal to retrieve the data.

2. The optical system as in claim 1, wherein the mutually orthogonal phase codes are Hadamard codes.

3. The optical system as in claim 1, wherein the scrambler applies a random phase setting to the mutually orthogonal phase codes of the spectral phase encoder, the resulting scrambled code being used by the scrambler for scrambling the combined data signals.

4. The optical system as in claim 1, wherein the modulated data signal is confined to a frequency bin defining a portion of optical bandwidth.

5. The optical system as in claim 1, wherein the spectral phase encoder and the plurality of spectral phase decoders are micro-ring resonators.

6. The optical system as in claim 1, wherein the spectral phase scrambler and the spectral phase descrambler are micro-ring resonators.

7. An optical transmitter for transmitting encrypted data, the optical transmitter comprising:
  a source for generating a sequence of optical pulses, each optical pulse having a plurality of spectral lines uniformly spaced in frequency with fixed absolute frequency and relative phase;
  a passive optical splitter for copying the sequence of optical pulses and outputting a plurality of channels, each channel being identical to the sequence of optical pulses;
  a plurality of data modulators, each associated with a respective channel of the plurality of channels, each data modulator modulating the respective channel using data to generate a modulated data signal;
  a respective spectral phase encoder coupled to each of the plurality of data modulators, the spectral phase encoder encoding respective modulated data signals using a plurality of mutually orthogonal phase codes that are individually associated with the respective spectral phase encoder;
  an optical combiner for combining the encoded data signals;
  a spectral phase scrambler for code-scrambling the combined data signals using a plurality of scramble codes individually associated with the respective channels as encryption keys to generate the encrypted signal.

8. The optical transmitter as in claim 7, wherein the mutually orthogonal phase codes are Hadamard codes.

9. The optical transmitter as in claim 7, wherein the scrambler applies a random phase setting to the mutually orthogonal phase codes, the resulting scrambled code being used by the scrambler for scrambling the combined data signals.

10. The optical transmitter as in claim 7, wherein the modulated data signal is confined to a frequency bin defining a portion of optical bandwidth.

11. The optical transmitter as in claim 7, wherein the spectral phase encoder is a micro-ring resonator.

12. The optical transmitter as in claim 7, wherein the spectral phase scrambler is a micro-ring resonator.

13. An optical receiver for receiving encrypted data, the optical receiver comprising:
  a spectral phase descrambler for descrambling a received encrypted signal using a plurality of scramble code compliments individually associated with each of a plurality of channels as decryption keys to generate a descrambled data signal;
  a plurality of spectral phase decoders for applying to the descrambled data signal an inverse of phase codes originally used for encoding the encrypted signal in order to generate a decoded signal, each spectral phase decoder being a conjugate match to a spectral phase encoder;
  a respective optical time gate coupled to each of the plurality of spectral phase decoders, for time gating the decoded signal to isolate a desired data signal; and
  a detector coupled to the respective optical time gate for detecting and demodulating the desired data signal to retrieve data.

14. The optical receiver as in claim 13, wherein the scramble code is generated by applying a random phase setting to the phase codes.

15. The optical receiver as in claim 13, wherein the desired data signal is confined to a frequency bin defining a portion of optical bandwidth.

16. The optical receiver as in claim 13, wherein the plurality of spectral phase decoders is a micro-ring resonator.

17. The optical receiver as in claim 13, wherein the spectral phase descrambler is a micro-ring resonator.

18. A method for transporting encrypted optical data, the method comprising:
  generating a sequence of optical pulses, each optical pulse having a plurality of spectral lines uniformly spaced in frequency with fixed absolute frequency and relative phase;
  copying the sequence of optical pulses and outputting a plurality of channels, each channel being identical to the sequence of optical pulses;
  modulating respective channels using data to generate a plurality of modulated data signals;
  encoding respective modulated data signals using a plurality of mutually orthogonal phase codes to generate a plurality of encoded data signals;
  combining the plurality of encoded data signals; and
  code-scrambling the combined plurality of encoded data signals using a plurality of scramble codes individually associated with the respective channels as encryption keys to generate an encrypted signal.

19. The method as in claim 18, wherein the mutually orthogonal phase codes are Hadamard codes.

20. The method as in claim 18, wherein the scramble code is generated by applying a random phase setting to the mutually orthogonal phase codes.

21. The method as in claim 18, wherein the modulated data signal is confined to a frequency bin defining a portion of optical bandwidth.

22. The method as in claim 18, wherein the encrypted signal is confined within a WDM channel spectral bandwidth.

* * * * *